Oct. 13, 1953
J. O. HICE ET AL
2,655,127
BATTER APPLYING APPARATUS
Original Filed Feb. 23, 1951
3 Sheets-Sheet 1
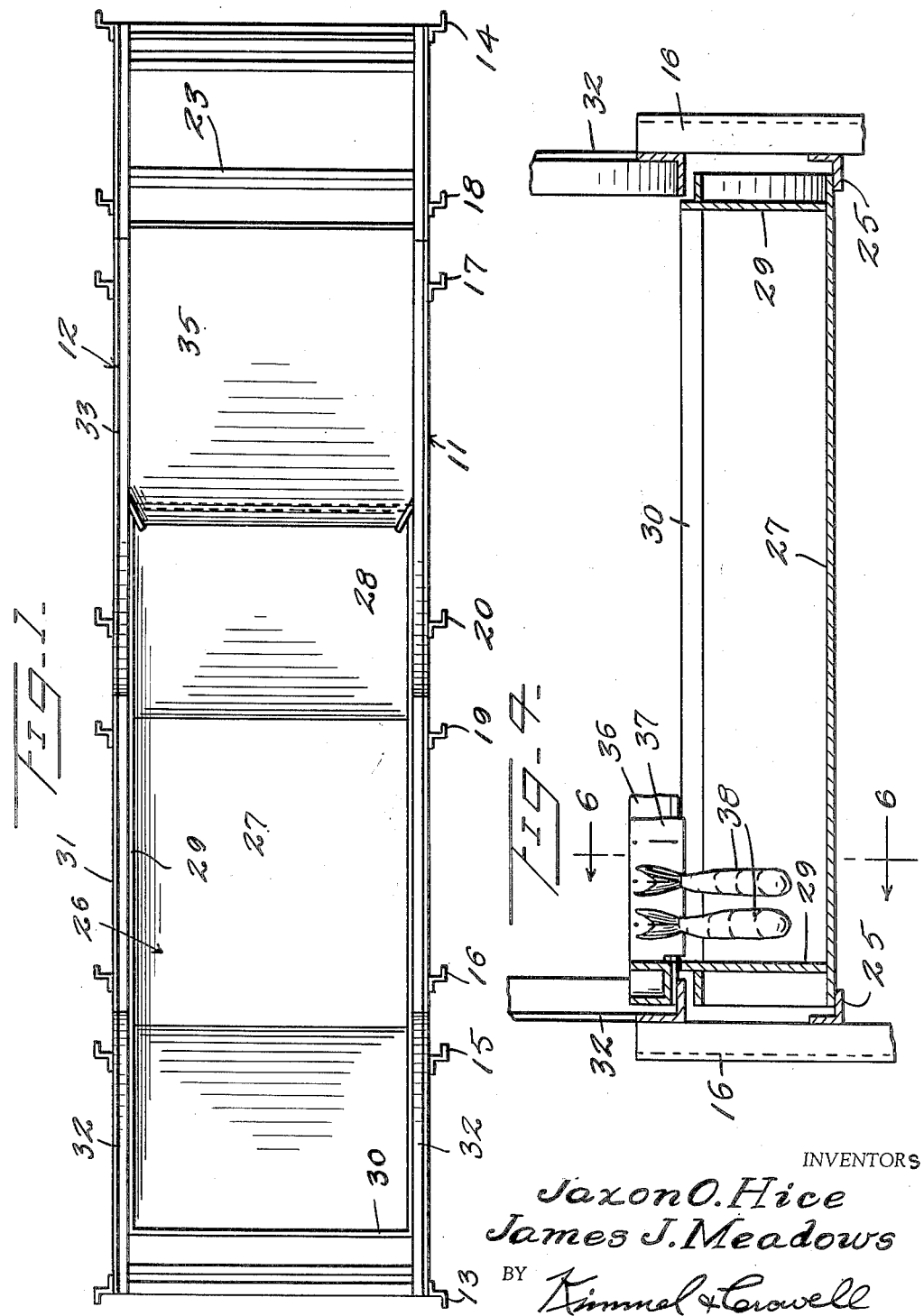
INVENTORS
Jaxon O. Hice
James J. Meadows
BY Kimmel & Crowell
ATTORNEYS Oct. 13, 1953 J. O. HICE ET AL 2,655,127
BATTER APPLYING APPARATUS
Original Filed Feb. 23, 1951 3 Sheets-Sheet 2
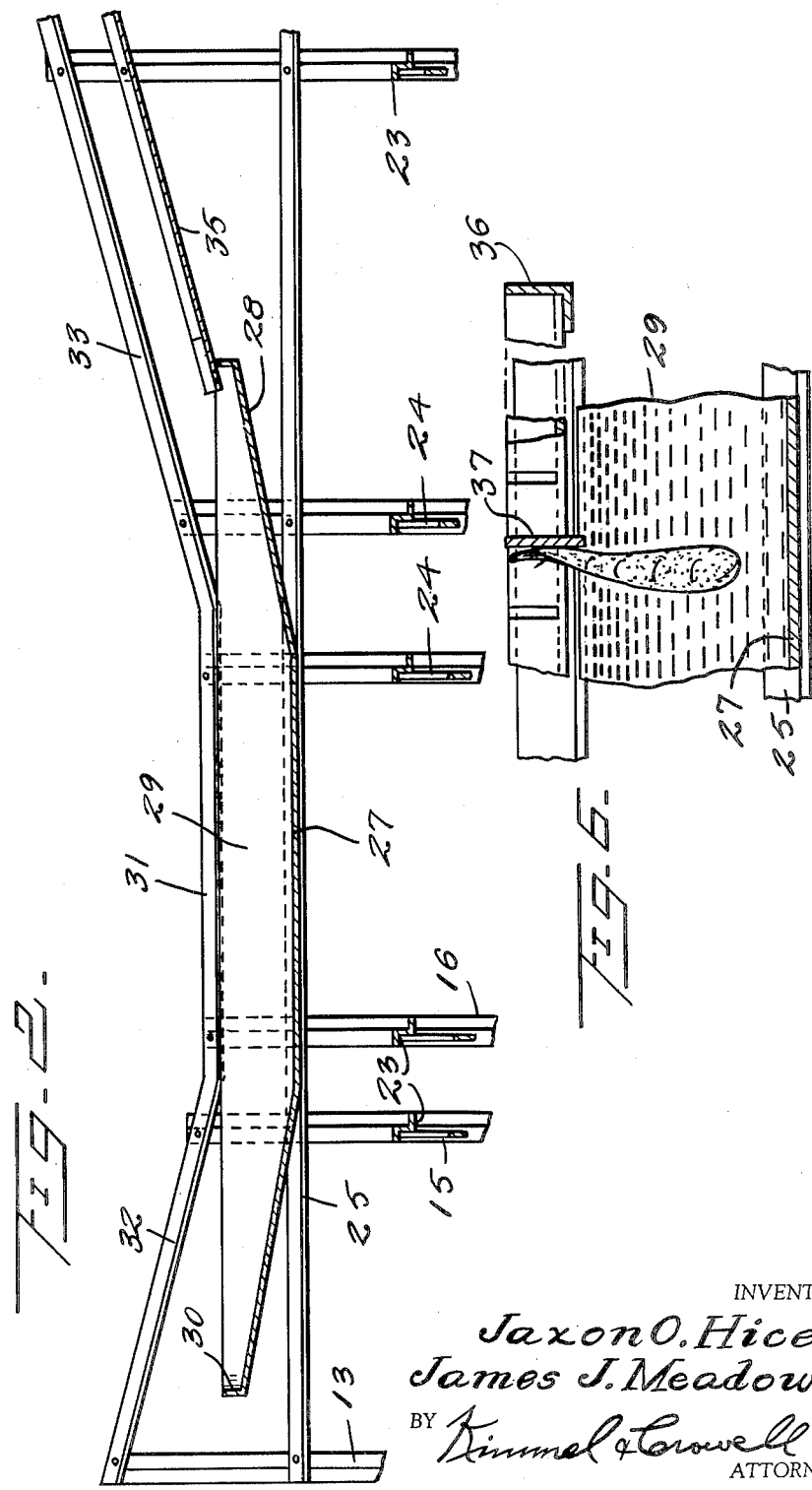
INVENTORS
Jaxon O. Hice
James J. Meadows
BY Kimmel & Crowell
ATTORNEYS

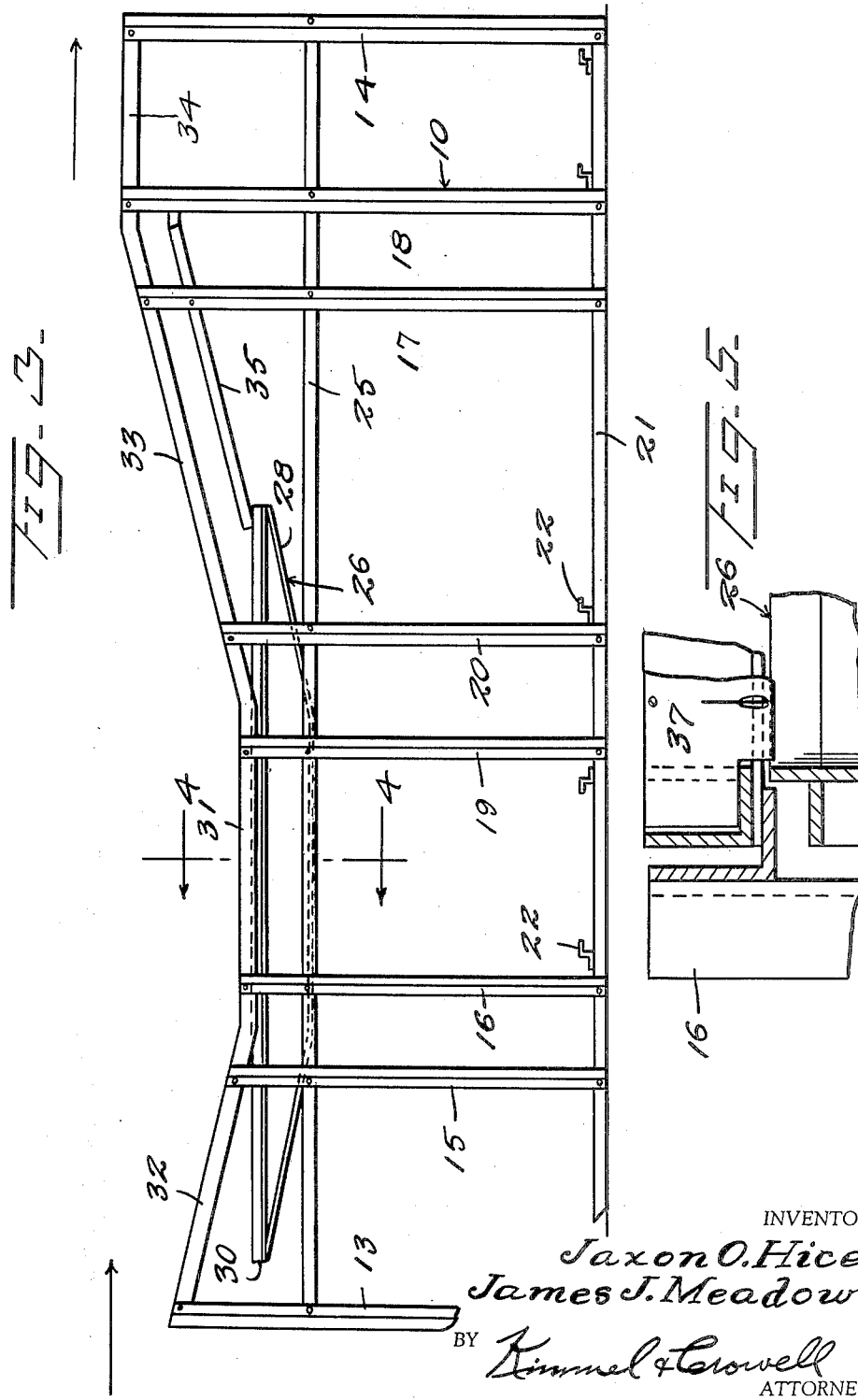

Patented Oct. 13, 1953

2,655,127

UNITED STATES PATENT OFFICE 2,655,127

BATTER APPLYING APPARATUS

Jaxon Odell Hice and James John Meadows, St. Simons Island, Ga., assignors to Seapak Corporation, St. Simons Island, Ga.

Original application February 23, 1951, Serial No. 212,271. Divided and this application February 23, 1951, Serial No. 212,273

2 Claims. (Cl. 118—30)

This invention relates to a batter applying apparatus for coating shrimp or other seafood with batter prior to covering the batter coating with meal, and is a division of our copending application for Method and Apparatus for Preparing, Freezing and Packing Frozen Shrimp, Serial No. 212,271, filed February 23, 1951.

In the preparation of seafood, such as for example, shrimp, for consumption, the articles of food are covered with a meal covering and are then frozen. Prior to applying the meal the articles are coated with a batter to which the meal sticks. On a quantity production basis it is desirable that the initial batter coating be accomplished quickly and with minimum effort. It is, therefore, an object of this invention to provide a batter applying device which will quickly and completely coat the articles with a liquid batter, the device being capable of evenly coating a relatively large number of articles at one time.

Another object of this invention is to provide a batter applying device which is simple in construction and can be maintained in sanitary condition.

A further object of this invention is to provide a batter applying device which will leave the non-edible portions of the articles uncoated with batter so that in the subsequent meal applying step such non-edible portions will not be covered with meal, thereby effecting a very substantial economy in the volume of meal used for the meal coating.

A further object of this invention is to provide a batter applying device embodying a batter reservoir having a shallow lead-in end and a shallow outlet end with a relatively deep central or body portion, the shallow lead-in or entrance to the body of the reservoir providing for the use of a relatively small amount of batter at the point where the articles are gradually entering the reservoir so as to eliminate air pockets about the articles. The shallow and gradually rising outlet end of the reservoir permits the initial draining of excess batter from the articles into the reservoir, and the use of a drain board or plate serves to return additional drippings to the reservoir after the articles have been lifted from the body of the batter. This apparatus and method assures an even batter coating about the articles so that in the subsequent mealing step or operation the meal will be evenly applied.

In the drawings:

Figure 1 is a plan view of a batter applying apparatus constructed according to an embodiment of this invention.

Figure 2 is a longitudinal section partly broken away of the device.

Figure 3 is a detailed side elevation of the device.

Figure 4 is a transverse sectional view taken on the line 4—4 of Figure 3.

Figure 5 is a fragmentary sectional view similar to Figure 4 on an enlarged scale.

Figure 6 is a sectional view taken on the line 6—6 of Figure 4.

Referring to the drawings the numeral 10 designates generally a frame structure which is formed of opposite side members 11 and 12. The side members 11 and 12 are of like construction and each includes opposite end uprights 13 and 14. A forward pair of uprights 15 and 16 are disposed inwardly from the forward upright 13 and a rear pair of uprights 17 and 18 are disposed inwardly from the rear upright 14.

An intermediate pair of uprights 19 and 20 are disposed between the inner uprights 16 and 17. The uprights 13 to 20, inclusive are secured at their lower ends to a lower frame bar 21, and a plurality of connecting angle bars 22 are secured between the angle members 21 so as to connect the opposite sides together at the lower ends thereof. The opposite sides are also connected together by upper connecting bars 23, and the sides are braced relative to each other by means of crossed bracing bars 24.

A horizontally disposed guide rail 25 is secured to the inner sides of each side member at a point below the upper end thereof and a batter pan generally designated as 26 is adapted to engage on the confronting guide rails 25. The batter pan 26 is formed of a bottom 27 having upwardly inclined opposite end portions 28, and the bottom 27 with the inclined portions 28 have secured thereto upright side members 29. Opposite end members 30 are secured between the opposite ends of sides 29 and the inclined bottom portions 28.

A horizontally disposed intermediate guide rail 31 is secured to each side member above the guide rail 25 and a downwardly and inwardly inclined guide rail 32 extends from the end uprights 31 and merges with the forward end of the intermediate rail 31. An upwardly and outwardly inclined guide rail 33 extends from the rear end of the intermediate rail 31 and merges with a rear horizontal guide rail 34. A drain or drip pan or tray 35 is secured between the uprights 17 and 18 being inclined downwardly and inwardly in substantially parallel relation to the inclined rails 33 and overlying the rear end portion of the batter pan 26. The pan racks or frames 36 which have mounted therein pin bars 37 carrying suspended shrimp or seafood articles 38 are adapted to be moved downwardly over the guide rails 32 and along the horizontal guide rails 31.

When the frames 36 are in a horizontal position on the guide rails 31 the shrimp or seafood articles will be immersed within the batter contained in the pan 26. The frame 36 is then moved forwardly and upwardly over the guide rails 33 and any excess batter draining from the shrimp 38 will drop onto the drain member or plate 35 and flow back into the batter pan 26. The rack 36 may be moved to its rearmost horizontal position on the horizontal guide bars 34 and from this position the rack members or frames 36 with the batter coated shrimp are moved to a meal applying device as set forth in my copending application supra, and from the meal applying apparatus the frames or racks 36 are moved into a quick freezer wherein the shrimp or articles 38 still in suspended relation on the pin bars 37 and spaced one from the other are quickly and solidly frozen. The batter applying apparatus hereinbefore described will provide an improved means whereby the suspended shrimp or seafood articles may be thoroughly and evenly coated with a batter so that in the subsequent meal applying step the meal will also be evenly applied.

What is claimed is:

1. A batter coating structure comprising an upstanding frame, a pair of horizontal supporting rails fixed in said frame, a batter pan supported on said rails, said pan having a flat horizontal central bottom portion and upwardly inclined bottom portions at each end, a pair of guide rails carried by said frame above said pan, and disposed at the opposite sides of the latter, said pair of guide rails including horizontal intermediate rail portions substantially coplanar with the upper edges of said pan, and substantially contiguous with said central bottom portion, a pair of downwardly and inwardly inclined guide rail portions connected with one end of said intermediate portions, upwardly and outwardly inclined rail portions extending from the opposite ends of said intermediate portions, said inclined rail portions overlying said inclined bottom portions, and horizontal rail portions extending from said outwardly inclined rail portions.

2. A batter coating structure comprising an upstanding frame, a pair of horizontal supporting rails fixed in said frame, a batter pan supported on said rails, said pan having a flat horizontal central bottom portion and upwardly inclined bottom portions at each end, a pair of guide rails carried by said frame above said pan, and disposed at the opposite sides of the latter, said pair of guide rails including horizontal intermediate rail portions, substantially coplanar with the upper edges of said pan, and substantially contiguous with said central bottom portion, a pair of downwardly and inwardly inclined guide rail portions connected with one end of said intermediate portions, upwardly and outwardly inclined rail portions extending from the opposite ends of said intermediate portions, said inclined rail portions overlying said inclined bottom portions, horizontal rail portions extending from said outwardly inclined rail portions, and a drain plate inclined toward said batter pan carried by said frame below said upwardly and outwardly inclined rail portions for draining the drippings into said pan.

JAXON ODELL HICE.
JAMES JOHN MEADOWS.

References Cited in the file of this patent

UNITED STATES PATENTS

| Number | Name | Date |
|---|---|---|
| 1,475,248 | Shafer | Nov. 27, 1923 |
| 1,960,339 | Howard | May 29, 1934 |
| 2,428,115 | Howard | Sept. 30, 1947 |

FOREIGN PATENTS

| Number | Country | Date |
|---|---|---|
| 117,115 | Australia | June 24, 1943 |